(12) United States Patent
Lei (10) Patent No.: US 9,166,399 B2
(45) Date of Patent: Oct. 20, 2015

(54) LITHIUM BATTERY PROTECTION CIRCUITRY

(75) Inventor: Shunhui Lei, Wuxi (CN)

(73) Assignees: CSMC TECHNOLOGIES FAB1 CO., LTD., Wuxi (CN); CSMC TECHNOLOGIES FAB2 CO., LTD., Wuxi (CN)

( * ) Notice: Subject to any disclaimer, the term of this patent is extended or adjusted under 35 U.S.C. 154(b) by 346 days.

(21) Appl. No.: 13/807,635

(22) PCT Filed: Nov. 29, 2011

(86) PCT No.: PCT/CN2011/083120
§ 371 (c)(1),
(2), (4) Date: Dec. 28, 2012

(87) PCT Pub. No.: WO2012/075896
PCT Pub. Date: Jun. 14, 2012

(65) Prior Publication Data
US 2013/0099755 A1    Apr. 25, 2013

(30) Foreign Application Priority Data
Dec. 9, 2010    (CN) .......................... 2010 1 0581451

(51) Int. Cl.
*H02J 7/00*    (2006.01)
*H02H 7/18*    (2006.01)

(52) U.S. Cl.
CPC ................ *H02H 7/18* (2013.01); *H02J 7/0029* (2013.01); *H02J 7/0031* (2013.01); *H02J 2007/0039* (2013.01); *Y02E 60/12* (2013.01)

(58) Field of Classification Search
CPC ............ H02J 7/0031; H02J 2007/0039; H02J 7/0029; Y02E 60/12; H02H 7/18

USPC ................................... 320/128, 134, 135, 136
See application file for complete search history.

(56) References Cited

U.S. PATENT DOCUMENTS

| | | | | |
|---|---|---|---|---|
| 5,530,336 | A * | 6/1996 | Eguchi et al. | 320/118 |
| 6,580,250 | B1 * | 6/2003 | Stellberger et al. | 320/134 |
| 6,670,939 | B2 * | 12/2003 | Yang et al. | 345/98 |
| 6,724,173 | B2 * | 4/2004 | Cummings | 320/134 |
| 6,992,463 | B2 * | 1/2006 | Yoshio | 320/134 |
| 6,998,668 | B2 * | 2/2006 | Nakase et al. | 257/312 |
| 7,282,890 | B2 * | 10/2007 | Adachi | 320/116 |
| 7,504,873 | B2 * | 3/2009 | Bourgoin et al. | 327/333 |

(Continued)

Primary Examiner — Helen Rossoshek
(74) Attorney, Agent, or Firm — Anova Law Group, PLLC (57) ABSTRACT

A lithium battery protection circuit coupled to a lithium battery is provided. The lithium battery protection circuit includes an over-charge protection circuit and a logic circuit coupled to over-charge protection circuit. The logic circuit has a first logic output and a second logic output. The lithium battery protection circuit also includes a level shift circuit coupled to the logic circuit through the first logic output and the second logic output, and the level shift circuit is configured to convert the first logic output and the second logic output to high voltage levels in an over-charge protection state. Further, the lithium battery protection circuit includes a substrate switching circuit coupled to the level shift circuit and a power transistor coupled between a negative end of the lithium battery and an external circuit negative electrode. The level shift circuit includes a first inverter coupled to the second logic output, a plurality of PMOS transistors, at least one of which has high source-drain voltage and low gate-source voltage, and a plurality of NMOS transistors, at least one of which is a low-voltage NMOS transistor.

20 Claims, 6 Drawing Sheets

(56) References Cited

U.S. PATENT DOCUMENTS

| | | | |
|---|---|---|---|
| 7,551,497 B2* | 6/2009 | Yuan | 365/189.11 |
| 7,583,060 B2* | 9/2009 | Kim | 320/134 |
| 7,629,771 B2* | 12/2009 | Li et al. | 320/134 |
| 7,694,243 B2* | 4/2010 | Camara et al. | 716/106 |
| 7,772,805 B2* | 8/2010 | Yamamoto et al. | 320/134 |
| 8,212,529 B2* | 7/2012 | Yamamoto | 320/134 |
| 8,638,121 B2* | 1/2014 | Suzuki et al. | 326/81 |
| 2003/0141847 A1* | 7/2003 | Fujiwara | 320/134 |
| 2012/0206105 A1* | 8/2012 | Nishizawa et al. | 320/134 |
| 2012/0306451 A1* | 12/2012 | Arai | 320/134 |

* cited by examiner

LITHIUM BATTERY PROTECTION CIRCUITRY

FIELD OF THE INVENTION

The present invention generally relates to the field of semiconductor integrated circuits and, more particularly, to lithium battery protection circuitry technologies.

BACKGROUND

When charging a lithium battery, if the charging voltage is too high, there might be a risk of battery explosion; if the charging voltage is too low, the battery life may be affected. In addition, when charging discharging the lithium battery, other abnormal conditions, such as excessive current and short-circuit, may also occur. Sometimes, the severity of such abnormal conditions may reach a certain level and may pose dangers to personal safety. To prevent these anomalies, special protection circuits re used to protect the lithium battery during the charging/discharging processes.

Figure 1:
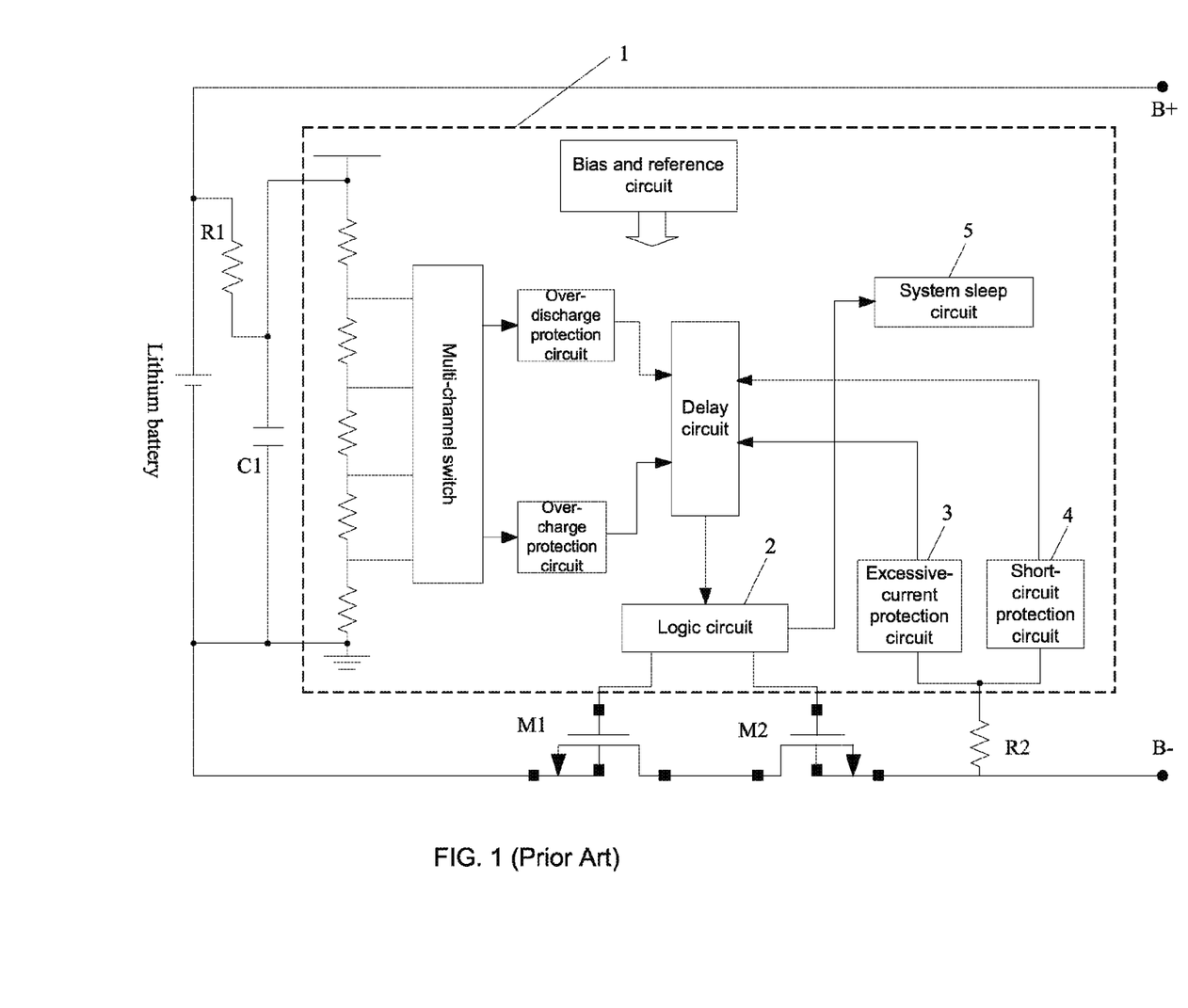
FIG. 1 shows a conventional protection circuit.

FIG. 1 shows a conventional lithium battery protection circuit. As shown in FIG. 1, the protection circuit includes a control circuit 1 (integrated circuit or IC), high-voltage power transistors M1 and M2, resistors R1 and R2, and capacitor C1. The drain terminals of the power transistors M1 and M2 are connected together; the gate terminals of the power transistors M1 and M2 are connected to the control circuit 1; the source terminal of the power transistor M1 is connected to the ground; and the source terminal of the power transistor M2 is connected to one end of the resistor R2 and also to the negative electrode "B−" to external circuits. The other end of the resistor R2 is connected to control circuit 1.

Further, one end of the resistor R1 is connected to the positive electrode of the lithium battery, and the other end of the resistor R1 is connected to one end of the capacitor C1. The other end of the capacitor C1 is connected to the ground and also to the negative electrode of the lithium battery. Both resistor R1 and capacitor C1 are connected to the control circuit 1. Two ends of the lithium battery are respectively connected to the external circuit positive electrode "B+" and negative electrode. "B−" When a load or an external circuit is connected between the positive electrode "B+" and negative electrode "B−", the lithium battery discharges and provides current to the load; when a charger is connected between the positive electrode B+" and negative electrode. "B−" the lithium battery is charged by the charger.

The control circuit 1 includes a bias and reference circuit, a multi-channel switch, an over-discharge protection circuit, and an over-charge protection circuit. Both the over-discharge protection circuit and the over-charge protection circuit are connected to the multi-channel switch. The over-discharge protection circuit and the over-charge protection circuit are also connected to logic circuit 2 via the delay circuit. The logic circuit 2, on the one hand, is connected to the gate terminals of power transistors M1 and M2 external to the control circuit 1 and, on the other hand, is connected to system sleep circuit 5. The excessive-current protection circuit 3 and short-circuit protection circuit 4 are connected to resistor R2 external to control circuit 1, and also to the logic circuit 2 via the delay circuit.

During a lithium battery charging process by a charger, if the battery voltage is higher than an over-charge protection voltage (typically 4.2V~4.3V), the logic circuit 2 turns off the power transistor M2, which further cuts off the charging circuit loop and stops charging tale lithium battery. After the power transistor M2 is turned off, because no load current flows through the charging circuit loop, the charger's output voltage becomes higher than usual. The external circuit negative electrode "B−" can have a negative high voltage (up to −20V), which requires logic circuit 2, excessive-current protection circuit 3, short-circuit protection 4, and power transistor M2 to be able to withstand the negative high voltage. Meeting such requirement is necessary to ensure that the protection circuit can be used in high-voltage charging applications, and also improves reliability of the protection circuit under different application conditions.

During a discharging process, if the voltage of the lithium battery drops below an over-discharge protection voltage (usually 2V~2.5V), and the low-voltage condition lasts longer than a specified delay time the logic circuit 2 turns off the power transistor M1, which stops the discharging. This condition may also show that the lithium battery has been exhausted. In order to better protect the lithium battery, logic circuit 2 also starts system sleep circuit 5 to put the entire control circuit 1 into a sleep state. Thus, the power consumed by the control circuit 1 itself can be reduced. Further, during the discharging process, if there is excessive-current or short-circuit condition, the logic circuit 2 also turns off the power transistor M1 to stop the discharging to protect the lithium battery.

Although the protection circuit as shown in FIG. 1 can achieve the goal of protecting the lithium battery during the charging/discharging processes, only the control circuit 1 is an integrated circuit, and other components in the protection circuit are external components. Thus, the degree of integration is relatively low and the manufacturing cost is relatively high.

Figure 2:
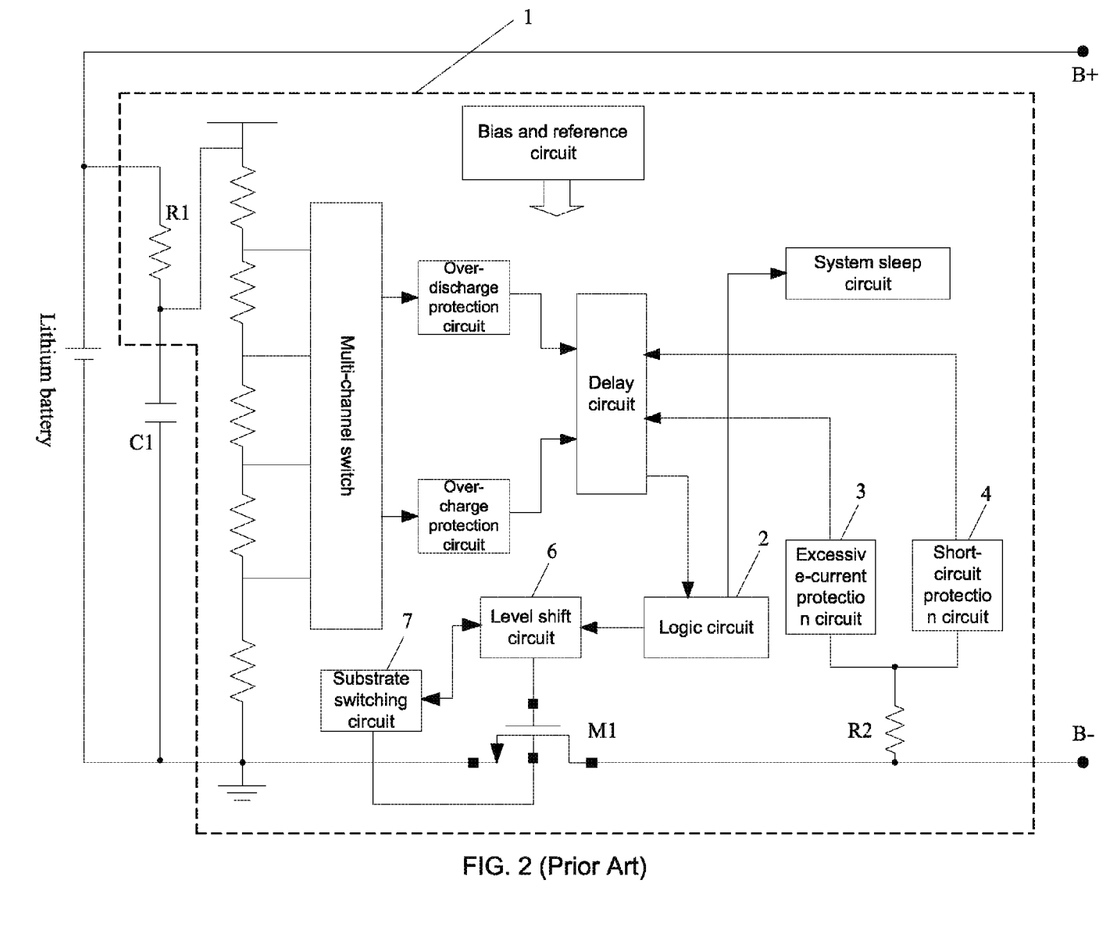
FIG. 2 shows another convention protection circuit.

FIG. 2 shows another conventional lithium battery protection circuit. As shown in FIG. 2, compared with the protection circuit in FIG. 1, the previous external resistors R1 and R2 and the power transistor M1 and M2 are integrated into the control circuit 1. Level shift circuit 6 and substrate switching circuit 7 are added to combine the power transistors M1 and M2 into one power transistor. Thus, the chip area and cost are reduced. The level shift circuit 6 is connected to the logic circuit 2, the substrate switching circuit 7, and the gate terminal of power transistor M1. The substrate switching circuit 7 is connected to the substrate of the power transistor M1 and the level shift circuit 6.

Although the protection circuit as shown in FIG. 2 increases the degree of integration and lowers cost, the excessive-current protection circuit 3, short-circuit protection circuit 4, level shift circuit 6, and substrate switching circuit 7 generally use low-voltage MOS devices (a low-voltage MOS device may only be able withstand a relative low voltage between the gate-source and the source-drain). In general, no other additional protective measures are used. Therefore, when protecting an overcharging condition, the protection circuit may be unable to withstand the high negative voltage from the external circuit negative electrode "B−". Thus, the protection circuit may have a low reliability and may be limited on its applications.

The disclosed methods and systems are directed to solve one or more problems set forth above and other problems.

BRIEF SUMMARY OF THE DISCLOSURE

One aspect of the present disclosure includes a lithium battery protection circuit coupled to a lithium battery. The lithium battery protection circuit includes an over-charge protection circuit and a logic circuit coupled to over-charge protection circuit. The logic circuit has a first logic output and a second logic output. The lithium battery protection circuit also includes a level shift circuit coupled to the logic circuit through the first logic output and the second logic output, and the level shift circuit is configured to convert the first logic output and the second logic output to high voltage levels in an over-charge protection state. Further, the lithium battery protection circuit includes a substrate switching circuit coupled to the level shift circuit and a power transistor coupled between a negative end of the lithium battery and an external circuit negative electrode. The level shift circuit includes a first inverter coupled to the second logic output, a plurality of PMOS transistors, at least one of which has high source-drain voltage and low gate-source voltage, and a plurality of NMOS transistors, at least one of which is a low-voltage NMOS transistor.

Another aspect of the present disclosure includes a lithium battery protection circuit coupled to a lithium battery. The lithium battery protection circuit includes a logic circuit having a first logic output and a second logic output, and a level shift circuit coupled to the logic circuit through the first logic output and the second logic output. The level shift circuit is configured to convert the first logic output and the second logic output to high voltage levels in an over-charge protection state. The lithium battery protection circuit also includes a substrate switching circuit coupled to the level shift circuit and a power transistor coupled between a negative end of the lithium battery and an external circuit negative electrode. Further, the level shift circuit includes a first transistor coupled to the first logic output through a second transistor, and a first transistor group, including a third transistor connected in series, connected in parallel to a source and a drain of the first transistor. The level shift circuit also includes a fourth transistor coupled to the second logic output through a fifth transistor, and a second transistor group, including a sixth transistor connected in series, connected in parallel to a source and a drain of the fourth transistor.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 3:
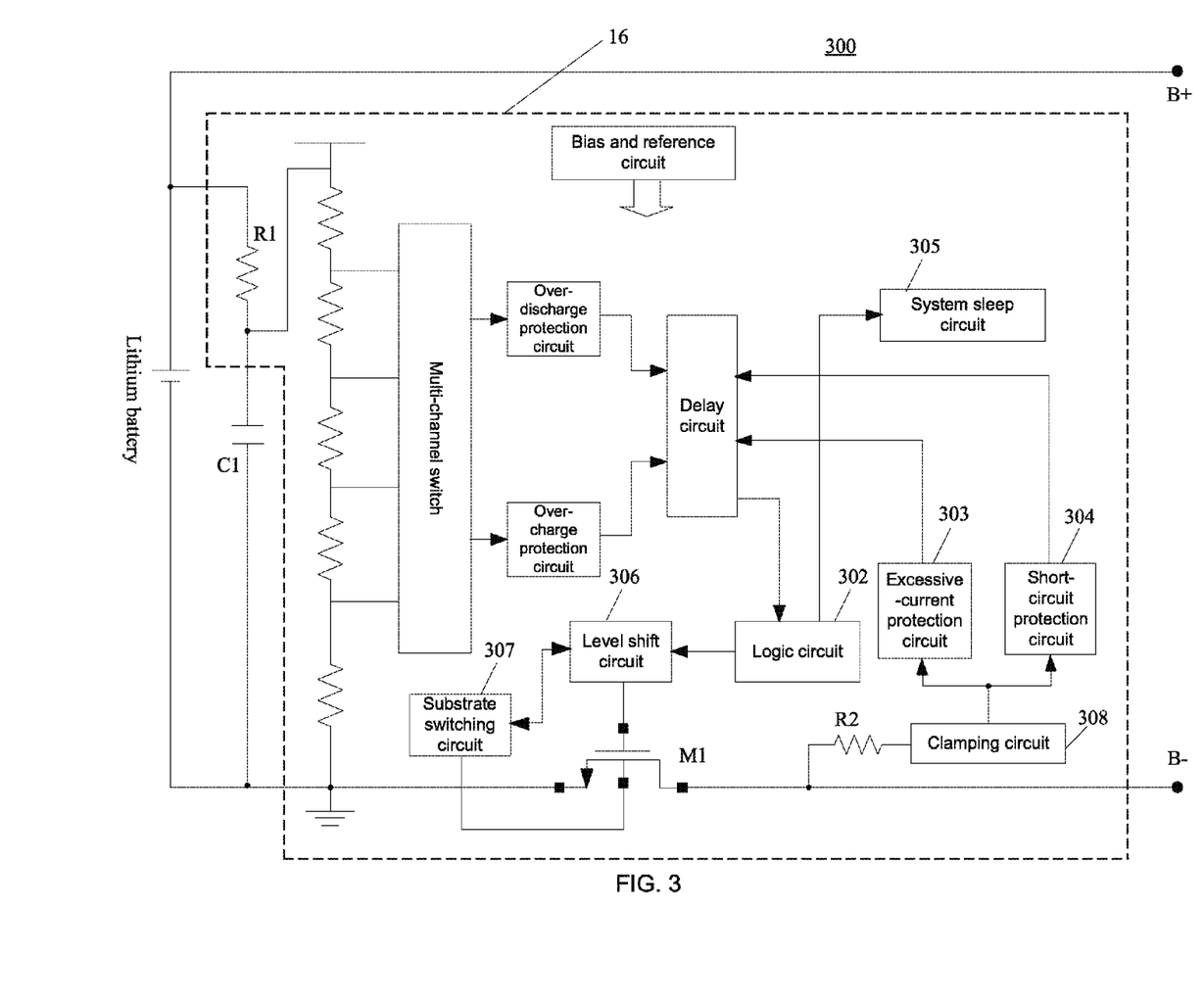
FIG. 3 illustrates an exemplary lithium battery protection circuit consistent with the disclosed embodiments.

FIG. 3 illustrates an exemplary lithium battery protection circuit 300 consistent with the disclosed embodiments. As shown in FIG. 3, the positive end and the negative end of the lithium battery are coupled or connected to the external circuit positive electrode "B+" and negative electrode "B−" respectively. Control circuit 16 (integrated circuit or IC) is coupled to the lithium battery through capacitor C1 to form a lithium battery protection circuit. Thus, the lithium battery protection circuit includes control circuit 16 as an IC and capacitor C1.

Control circuit 16 integrates a plurality of components. For example, a first resistor R1, a second resistor R2, the power transistor M1, a bias and reference circuit, a multi-channel switch, an over-discharge protection circuit, an over-charge protection circuit, a delay circuit, a logic circuit 302, an excessive-current protection circuit 303, a short-circuit protection circuit 304, a system sleep circuit 305, a level shift circuit 306, a substrate switching circuit 307, and a clamping circuit 308. Certain component(s) may be omitted, and other component(s) may be included.

More particularly, the over-discharge protection circuit and the over-charge protection circuit are coupled to one end of the lithium battery (e.g., the positive end) through the multi-channel switch. The over-discharge protection circuit and the over-charge protection circuit are also coupled the delay circuit. The excessive-current protection circuit 303 and short-circuit protection circuit 304 are coupled to the other end of the lithium battery (e.g., the negative end) through power transistor M1, resistor R2, and clamping circuit 308.

Further, the logic circuit 302 may be coupled to the delay circuit to receive charging/discharging status information from the over-discharge protection circuit, the over-charge protection circuit, the excessive-current protection circuit 303, and short-circuit protection circuit 304, etc. The logic circuit 302 may also be coupled to system sleep circuit 305 and level shift circuit 306 such that the logic circuit 302 may control system sleep circuit 305 and level shift circuit 306 to perform certain battery protection processes.

The level shift circuit 306 is coupled to the gate terminal of power transistor M1, and also coupled to the substrate switching circuit 307, which is further coupled to the substrate of power transistor M1. Further, the power transistor M1 is coupled between one end of the lithium battery (e.g., the negative end) and the corresponding external electrode (e.g., the negative electrode "B−") to control the charging/discharging circuit loop. Other configurations may also be used.

In operation, during a charging process, if the battery voltage is higher than an over-charge protection voltage (typically 4.2V~4.3V), the logic circuit 302 turns off the power transistor M1 through the level shift circuit 306. Thus, the charging circuit loop is broken and the charging is stopped. On the other end, during a discharging process, if the battery voltage of the lithium battery drops below an over-discharge protection voltage (usually 2V~2.5V) and the low battery voltage level is lasted longer than a predetermined delay time, the logic circuit 302 turns off the power transistor M1 through the level shift circuit 306 to stop discharging.

At the same time, the logic circuit 302 controls the system sleep circuit 305 to put the entire control circuit 16 into a sleep state, thereby greatly reducing the power consumption of the control circuit 16. Similarly, when there is excessive current or short-circuit during the discharging process, the logic circuit 302 also controls the level shift circuit 306 to turn off the power transistor M1 to stop the discharging and to protect the lithium battery.

When the lithium battery is in the over-charge protection state, the external circuit negative electrode "B−" has a negative high voltage, the lowest voltage level in the charging circuit. In order to reliably turn off the power transistor M1, the negative high voltage levels on the substrate and the gate terminal of the power transistor M1 should be the same as the negative high voltage on the negative electrode "B−". Thus, the level shift circuit 306 converts the low logic voltage level into negative high voltage level applied on the gate terminal of the power transistor M1; while the substrate switching circuit 307 switches the voltage level of the substrate of the power transistor M1 to the high negative voltage level.

On the other hand, when the lithium battery is in a normal discharging state, the voltage level on the external circuit negative electrode "B−" may be higher than 0V. In order to reliably turn off the power transistor M1 under excessive current, short-circuit, or over-discharging condition, the substrate switching circuit 307 switches the voltage level of the substrate of the power transistor M1 to the lowest voltage level of 0V. Thus, the level shift circuit 306 and the substrate switching circuit 307 are configured to convert or switch the voltage levels of the gate terminal and the substrate of the power transistor M1.

Further, when the lithium battery is in the over-charge protection state and the external circuit negative electrode "B−" has a negative high voltage (up to −20V), the clamping circuit 308 may limit the negative high voltage within a predetermined range (−2V∼−3V). Thus, low-voltage MOS devices in the excessive-current protection circuit 303 and the short-circuit protection circuit 304 can be protected against the negative high voltage to avoid breakdown of these devices and/or circuits. The reliability of the lithium battery protection circuit can then be improved, and the range of applications of such protection circuit can be expanded. When the lithium battery is in normal charging or discharging condition or in an over-discharge protection state, the clamping circuit 308 is not operational, and its output voltage level may be the same as the voltage level of the external circuit negative electrode "B−".

Figure 4:
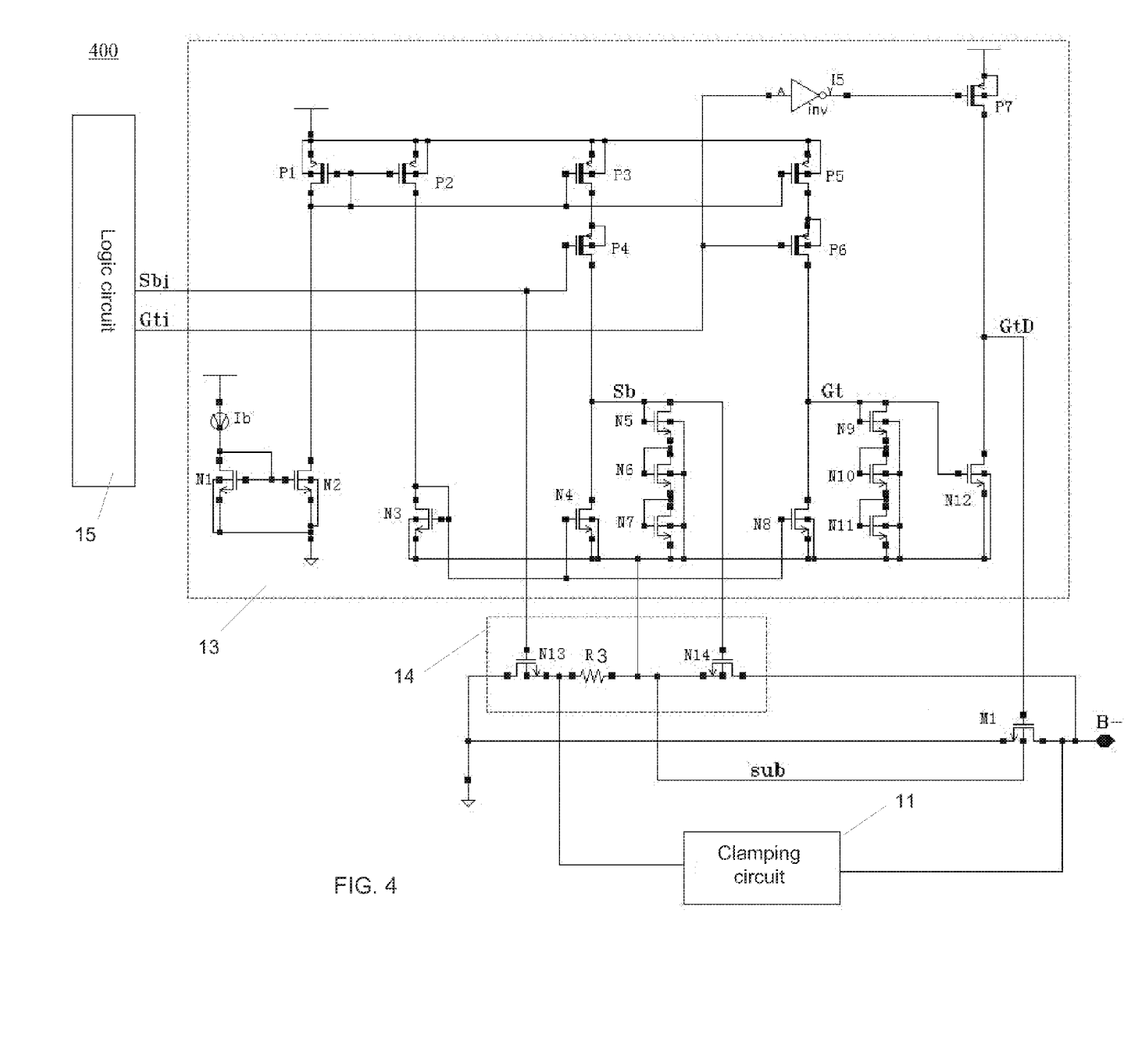
FIG. 4 illustrates another exemplary lithium battery protection circuit consistent with the disclosed embodiments.

Further, the component circuits in the lithium battery protection circuit 300 may be implemented in a way such that low-voltage transistors within these component circuits are protected from the negative high voltage. FIG. 4 illustrates certain parts of an exemplary lithium battery protection circuit 400 in implementation details.

As shown in FIG. 4, the protection circuit 400 includes a logic circuit 15 (or logic circuit 302), a level shift circuit 13 (or level shift circuit 306), a substrate switching circuit 14 (or substrate switching circuit 307), a power transistor M1, and clamping circuit 11. Certain components may be omitted and other components may be added. Further, the level shift circuit 13 may be coupled to the logic circuit 15, the substrate switching circuit 14 may be coupled to the level shift circuit 13 and power transistor M1, and the clamping circuit 11 may be coupled between the external circuit negative electrode "B−" and the substrate switching circuit 14.

More specifically, the level shift circuit 13 may include a current source Ib, a PMOS current source formed by mirroring (including the first, second, third, and fifth PMOS transistors P1, P2, P3, and P5), and an NMOS current source (including the first second, third, fourth, and eighth NMOS transistors N1, N2, N3, N4, and N8). The level shift circuit 13 also includes the fourth and sixth PMOS transistors P4 and P6 for controlling voltage level shifting and flipping, a first group of NMOS transistors coupled to the fourth NMOS transistor N4 and for limiting the source-drain voltage of the fourth NMOS transistor N4, a second group of NMOS transistors coupled to the eighth NMOS transistor N8 and for limiting the source-drain voltage of the eighth transistor N8, and the seventh PMOS transistor P7 and twelfth NMOS transistor N12 for controlling the gate voltage of the power transistor M1.

The first group of NMOS transistors may include a single NMOS transistor or two or more NMOS transistors connected in series in a diode form. The second group NMOS transistors may also include a single NMOS transistor or two or more NMOS transistors connected in series in the diode form. In certain embodiments, as shown in FIG. 4, the first group may include three NMOS transistors connected in series as the fifth, sixth, and seventh NMOS transistors N5, N6, and N7; and the second group may also include three NMOS transistors connected in series as the ninth, tenth, and eleventh NMOS transistors N9, N10, and N11.

Further, the current source Ib is coupled to the drain of the first NMOS transistor N1; the second NMOS transistor N2 and the first NMOS transistor N1 are connected in the mirroring form; the gate and the drain of the first NMOS transistor N1 are connected together; the source and the substrate of the first NMOS transistor N1 are grounded; and the gate and the drain of the second NMOS transistor N2 are also grounded. The mirroring form, as used herein, may refer to a form of connection of two or more MOS transistors where the gate terminals of the transistors are connected, the source terminals of the transistors are connected, the source and substrate of each MOS transistor are connected together, and the gate and the drain of at least one MOS transistor are connected together.

The drain terminals of the first PMOS transistor P1 and the second NMOS transistor N2 are connected. The second, third, fifth PMOS transistor P2, P3, and P5 are connected to the first PMOS transistor P1 in the mirroring form, and the gate and the drain of the first PMOS transistor P1 are connected together. Further, the drain terminals of the third NMOS transistor N3 and the second PMOS transistor P2 are connected. The third NMOS transistor N3 is connected to the fourth and eighth NMOS transistors N4 and N8 in the mirroring form, and the gate and the drain of the third NMOS transistor N3 are connected together.

Further, the fifth, sixth, and seventh NMOS transistors N5, N6, and N7 are connected in series in the diode form, and the serially connected transistors N5, N6, and N7 are connected to the fourth NMOS transistor N4 in parallel. A serial connection in the diode form, as used herein, may refer to a serial connection of two or more MOS transistors wherein the gate and drain of each MOS transistor are connected, the source and the drain of the adjacent two MOS transistors are connected, and the substrate of each MOS transistor is connected together and also to the source of the last MOS transistor.

The fifth, sixth, and seventh NMOS transistors N5, N6, and N7 are connected in series and the serially connected NMOS transistors are connected to the fourth NMOS transistor N4 in parallel. That is, the drain of the fifth NMOS transistor N5 is connected to the drain of the fourth NMOS transistor N4, and the source of the seventh NMOS transistor N7 is connected to the source of the fourth NMOS transistor N4. Further, the source of the fourth NMOS transistor N4 is connected to the source of the fourteenth NMOS transistor N14 in the substrate switching circuit 14, and the drain of the fourth NMOS transistor N4 (also the drain of the fourth PMOS transistor P4) is connected to the gate of the fourteenth NMOS transistor N14 in the substrate switching circuit 14. The ninth, tenth, and eleventh NMOS transistors N9, N10, N11 are connected in series in the diode form, and the serially connected transistors are connected to the eighth NMOS transistor N8 in parallel.

The fourth PMOS transistor P4 is coupled in serial between the third PMOS transistor P3 and the fourth NMOS transistor N4. That is, the source of the fourth PMOS transistor P4 is connected to the drain of the third PMOS transistor P3; the drain of the fourth PMOS transistor P4 is connected to the drain of the fourth NMOS transistor N4 (the node where the two drains are connected is marked as Sb); the substrate and the source of the fourth PMOS transistor P4 are connected together; the gate of the fourth PMOS transistor P4 is connected to the gate of the thirteenth NMOS transistor N13 in the substrate switching circuit 14, and the gate of the fourth PMOS transistor P4 is connected to the output Sbi of the logic circuit 15.

Further, the sixth PMOS transistor P6 is coupled in serial between the fifth PMOS transistor P5 and the eighth NMOS transistor N8. That is, the source of the sixth PMOS transistor P6 is connected to the drain of the fifth PMOS transistor P5; the drain of the sixth PMOS transistor P6 is connected to the drain of the eighth NMOS transistor N8 (the node where the two drains are connected is marked as Gt); the substrate and the source of the sixth PMOS transistor P6 are connected together; and the gate of the sixth PMOS transistor P6 is connected to the output Gti of the logic circuit 15.

The gate of the seventh PMOS transistor P7 is coupled to the gate of the sixth PMOS transistor P6 through the first inverter I5. The gate of the sixth PMOS transistor P6 is connected to the input of the first inverter I5, and the gate of the seventh PMOS transistor P7 is connected to the output of the first inverter 5. Further, the source and the substrate of the seventh PMOS transistor P7 are connected together, and the drain of the seventh PMOS transistor P7 is connected to the gate of the power transistor M1.

The gate of the twelfth NMOS transistor N12 is connected to the gate of the eighth NMOS transistor N8, and the source of the twelfth NMOS transistor N12 is connected to the source of the eighth NMOS transistor N8. The source and the substrate of the twelfth NMOS N12 are connected together, and the drain of the twelfth NMOS transistor N12 is connected to the gate of the power transistor M1, i.e., the drain of the twelfth NMOS transistor N12 is connected to the drain of the seventh PMOS transistor P7 (the node where the two drains are connected is marked as GtD).

Further, the substrate switching circuit 14 may include any appropriate components or circuits for switching the voltage level of the substrate of the power transistor M1. For example, the substrate switching circuit 14 may include a thirteenth NMOS transistor N13, a fourteenth NMOS transistor N14, and a third resistor R3 connected in serial between the source of the thirteenth NMOS transistor N13 and the source of the fourteenth NMOS transistor N14. The drain of the thirteenth NMOS transistor N13 is grounded and also connected to the source of the power transistor M1. Further, the source of the thirteenth NMOS transistor N13 is connected to an output of the clamping circuit 11, and the gate of the thirteenth NMOS transistor N13 is connected to the level shift circuit 13.

The drain of the fourteenth NMOS transistor N14 is connected to the external circuit negative electrode "B−"; the gate of the fourteenth NMOS transistor N14 is connected to the level shift circuit 13; and the source of the fourteenth NMOS transistor N14 is connected to the substrate of the power transistor M1 and also to the level shift circuit 13. The source and the substrate of either the thirteenth NMOS transistor N13 or the fourteenth NMOS transistor N14 are connected together.

Further, the current source Ib may be generated by the bias and reference circuit, and the current in the first, second, third, fourth, and eighth NMOS transistors N1, N2, N3, N4, and N8 and the first, second, third, and fifth PMOS transistor P1, P2, P3, and P5 may be determined by the types and/or sizes of these transistors and the current source Ib. For example, in certain embodiments, the first and second NMOS transistors N1 and N2 are ordinary low-voltage NMOS transistors; the third to the fourteenth NMOS transistor N3-N14 are low-voltage substrate isolated NMOS transistors; and the first to the seventh PMOS transistor P1-P7 are high source-drain voltage and low gate-source voltage PMOS transistors (i.e., being able to withstand high source-drain voltages but only low gate-source voltages).

Because the fifth, sixth, and seventh NMOS transistors N5, N6, and N7 are connected in series in the diode form, and the current passing through the third PMOS transistor P3 is relatively small, the voltage level between the node Sb and the substrate ("sub") of the power transistor M1 may be is limited to 3Vgs (3 times gate-source voltage of the NMOS transistor, about 2V~3V). Thus, all of the fourth, fifth, sixth, and seventh NMOS transistors N4, N5, N6, and N7 only need to withstand relatively low voltage levels.

Similarly, all of the eighth, ninth, tenth, and eleventh NMOS transistors N8, N9, N10, and N11 also only need to withstand relatively low voltage levels. Further, the third NMOS transistor N3 is connected in the diode form (e.g., the gate and the drain being connected together), and the levels of the gate-source voltage and the source-drain voltage are also relatively low. Thus, the third NMOS transistor N3 also only needs to withstand relatively low voltage levels. In addition, when there is a high negative voltage on the external circuit negative electrode "B−", the clamping circuit 11 may limit the voltage level in a range of −2V~−3V. Thus, the source voltage of the thirteenth NMOS transistor N13 is also relatively low, and the thirteenth NMOS N13 does not need to withstand relatively high voltage levels.

In operation, the components described above in the level shift circuit 13 and substrate switching circuit 14 may carry out certain lithium protection functions. For example, during a lithium battery discharging process, the highest voltage in the protection circuit may be the voltage of the lithium battery, which is generally low (e.g., 4.3V or lower). The logic circuit 15 controls the Sbi to output a high voltage level. At this time, the thirteenth NMOS transistor N13 is turned on and the fourth PMOS transistor P4 is turned off. Because the fourth PMOS transistor P4 is turned off, no current flows through the fourth to the seventh NMOS transistors N4~N7, the voltage level of the node Sb is dropped down to the voltage level of the substrate of the power transistor M1 (Vsub) by the fourth NMOS transistor N4, and the fourteenth NMOS transistor N14 is turned off. Thus, the substrate of the power transistor M1 is coupled to the ground through the third resistor R3 and the thirteenth NMOS transistor N13 and has a voltage level of 0V.

In a normal discharging condition, the logic circuit 15 controls the Gti to output a high voltage level, which becomes a low voltage level through the first inverter I5, and the seventh PMOS transistor P7 is turned on. However, the sixth PMOS transistor P6 is turned off, the node Gt has a low voltage level, and the twelfth NMOS transistor N12 is turned off. Thus, the node GtD has a high voltage level, the power transistor M1 is turned on, and the lithium battery discharges normally.

When there is any over-discharge, excessive-current, or short-circuit condition, the logic circuit 15 controls the Gti to output a low voltage level. At this time, the seventh PMOS transistor P7 is turned off, the sixth PMOS transistor P6 is turned on, and the current in the fifth PMOS transistor P5 flows to the eighth to the eleventh NMOS transistors N8~N11. However, the voltage level at the node Gt is limited to 3Vgs (about 2V~3V), which is still significantly higher than the turn-on voltage of the twelfth NMOS transistor N12. Thus, the twelfth NMOS transistors N12 is turned on, and the voltage level as node GtD is pulled down to a low voltage level. Further, the power transistor M1 is turned off, the discharging circuit is broken, and the abnormal discharging of the lithium battery can be protected.

In a normal charging process of the lithium battery, the logic circuit 15 controls the Sbi to output a low voltage level. The thirteenth NMOS transistors N13 is turned off, the fourth PMOS transistor P4 is turned on, the voltage level of node Sb is limited to 3Vgs (about 2V~3V), the fourteenth NMOS transistor N14 is turned on, and the voltage level of the substrate (Vsub) of power transistor M1 is equal to voltage on the external circuit negative electrode "B−". At this moment, because the lithium battery has a low voltage and the power transistor M1 is turned on, the entire circuit is still in a low-voltage state.

After the charging process continues for a certain amount of time, the voltage level of the lithium battery may reach and exceed the overcharge protection voltage. The logic circuit 15 controls the Gti to output a low voltage level. Thus, the seventh PMOS transistor P7 is turned off, the twelfth NMOS transistor N12 is turned on, the voltage of the node GtD is pulled down to the low voltage level, and the power transistor M1 is turned off. At this moment, a negative high voltage appears on the external circuit negative electrode "B−". Because the fourteenth NMOS transistor N14 is in a conduction state (or a turned-on state), the voltage on the substrate of the power transistor M1 is also at the negative high voltage level. At this point, both nodes Sb and Gt have a voltage level of 3Vgs $V_{B-}$ ($V_{B-}$ being the voltage level of the substrate of the power transistor M1, or the voltage on the external circuit negative electrode "B−").

Thus, the input signals Sbi and Gti are converted from low voltage levels (e.g., 0V) to high voltage levels (e.g., voltage 3Vgs+$V_{B-}$, 3Vgs higher than the voltage level at the substrate of the power transistor M1) to achieve voltage level conversion. Further, in the lithium battery overcharge protection state, the external circuit negative electrode "B−" has a negative high voltage, and the nodes Sb and Gt also have a negative high voltage of 3Vgs+$V_{B-}$. Such negative high voltage may be withstood by the third to the sixth PMOS transistor P3~P6, which have high source-drain voltages.

Similarly, the drain of the third NMOS transistor N3 also has a negative high voltage, and such negative high voltage may be withstood by the second PMOS transistor P2. However, although the nodes Sb and Gt have the negative high voltage, the voltage difference on the third to the eleventh NMOS transistors N3~N11 does not exceed 3Vgs. Thus, the third to the eleventh NMOS transistors N3~N11 still have low voltage levels and do not need to withstand high voltage level.

Also, in the overcharging protection state, the twelfth and fourteenth NMOS transistors N12 and N14 are turned on, the source-drain voltage of these transistors is close to 0V and the gate-source voltage of these transistors does not exceed 3Vgs. Thus, the twelfth and the fourteen NMOS transistors N12 are N14 only need to withstand low voltage levels. In addition, the clamming circuit 11 may limit the negative high voltage from the external circuit negative electrode "B−" to a range of −2V~−3V. Thus, the thirteenth NMOS transistor N13 also only needs to withstand low voltage levels. Of course, the voltage difference across the third resistor R3 may be large, and the third resistor R3 may need to withstand high voltages. In certain embodiments, the third resistor R3 may be high voltage polysilicon resistors.

Therefore, in the lithium battery overcharge protection state, the external circuit negative electrode "B−" has a negative high voltage, and the logic circuit 15 controls nodes Sbi and Gti to output a low voltage level (e.g., 0V). The low voltage level is converted into high voltage level of 3Vgs+ $V_{B-}$ by level shift circuit 13, and the twelfth and fourteenth NMOS transistors N12 and N14 are turned on. Such low voltage level also controls the substrate switching circuit 14 to convert between the low voltage level (e.g., 0V) and the voltage on the external circuit negative electrode "B−". The substrate switching circuit 14 also provides the converted voltage level to both the power transistor M1 and the level shift circuit 13.

On the other hand, the negative high voltage on the external circuit negative electrode "B−" is withstood by the second to the seventh PMOS transistor P2~P7 with high source-drain voltages and the third resistor R3. Although the negative high voltage may appear on one end of the other low-voltage NMOS transistors, the voltage differences on those NMOS transistors are still small and, thus, high voltage NMOS transistors may be unnecessary.

Figure 5:
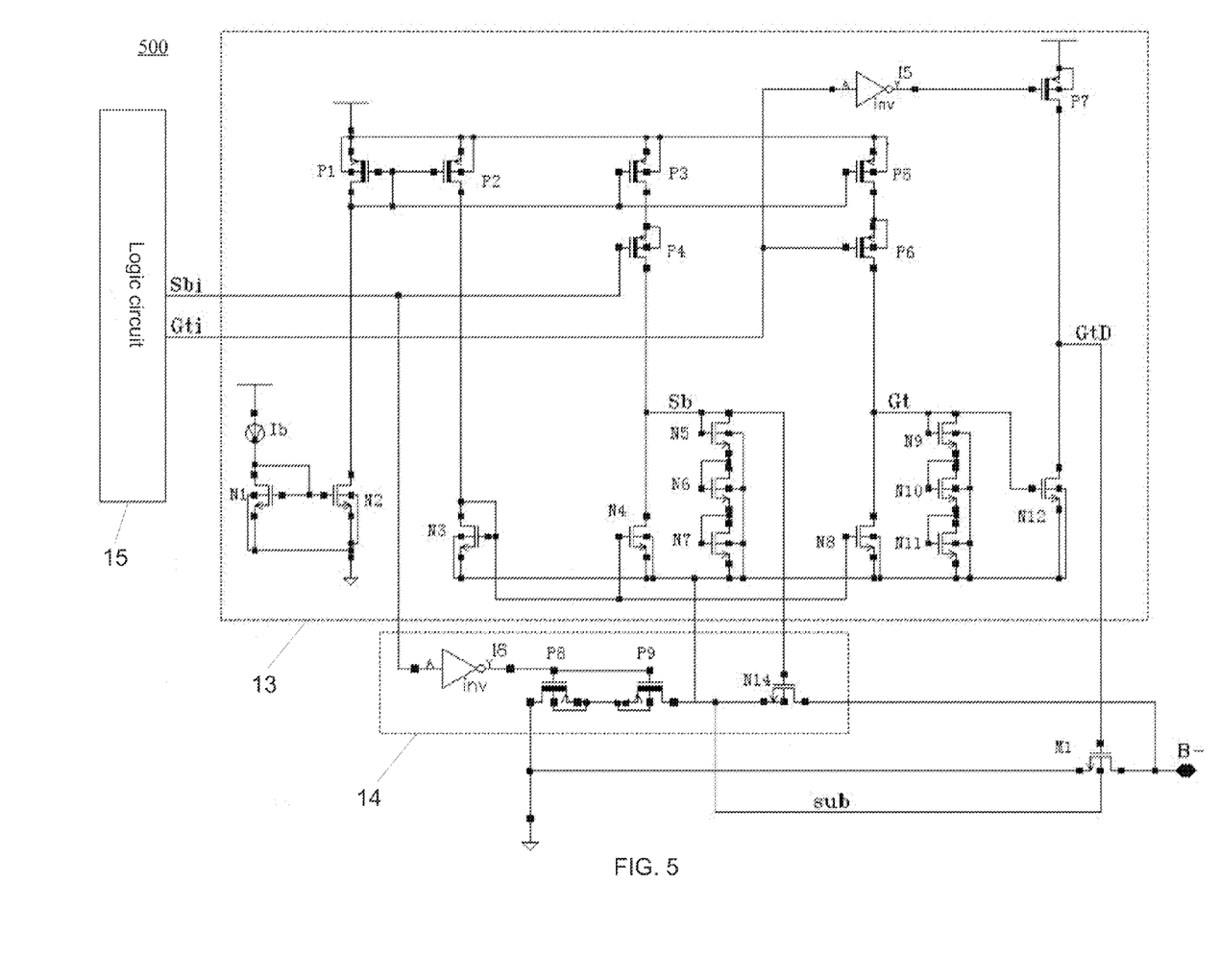
FIG. 5 illustrates another exemplary lithium battery protection circuit consistent with the disclosed embodiments.

FIG. 5 illustrates another exemplary lithium battery protection circuit 500 consistent with the disclosed embodiments. The protection circuit 500 shown in FIG. 4 is similar to the protection circuit 400 in FIG. 4. However, as shown in FIG. 5, the substrate switching circuit 14 includes a second inverter I8, eighth and ninth PMOS transistors P8 and P9 with high source-drain voltages, and a fourteenth NMOS transistor N14.

The input of the second inverter I8 is connected to the gate of the fourth PMOS transistor P4 in the level shift circuit 13, and the output of the second inverter I8 is connected to the gate terminals of the eighth and ninth PMOS transistors P8 and P9. The source of the eighth PMOS transistor P8 is connected to the source of the ninth PMOS transistor P9; the source and the substrate of either the eighth PMOS transistor P8 or the ninth PMOS transistor P9 are connected together; and the drain of the eighth PMOS transistor P8 is coupled to the ground and also coupled to the source of the power transistor M1.

The drain of the ninth PMOS transistor P9 is connected to the source of the fourteenth NMOS transistor N14 and also connected to the substrate of the power transistor M1 and the source of the fourth NMOS transistor N4 in the level shift circuit 13. Further, the gate of the fourteenth NMOS transistor N14 is connected to the source of the fourth PMOS transistor P4 in the level shift circuit 13; and the drain of the fourteenth NMOS transistor N14 is connected to the external circuit negative electrode "B−".

Substrate switching circuit 14 may operate during the lithium battery charging/discharging process. For example, during the lithium battery discharging process, the logic circuit 15 controls the Sbi to output a high voltage level, which becomes a low voltage level through the second inverter I8. The eighth and ninth PMOS transistors P8 and P9 are then turned on, and the fourteenth NMOS transistor N14 is turned off.

In the lithium battery over-charge protection state, the voltage on the substrate of the power transistor M1 (Vsub) needs to be shifted to the voltage level on the external circuit negative electrode "B−". At this point, the second inverter I8 outputs a high voltage level, the eighth and ninth PMOS transistors P8 and P9 are turned off, and the fourteenth NMOS transistor N14 is turned on. When the external circuit negative electrode "B−" has a negative high voltage, the voltage of the substrate of the power transistor M1 (Vsub) is also a high negative voltage. The high negative voltage is withstood by the eighth and ninth PMOS transistors P8 and P9 with high source-drain voltages, without the additional clamping circuit 11 and the third resistor R3 as shown in FIG. 4. That is, by using PMOS transistors with high source-drain voltages but low gate-source voltages within the substrate switching circuit 14, and an additional inverter and low-voltage NMOS transistor, the substrate switching circuit 14 can withstand high voltages without a clamping circuit.

It should be noted that, although clamping circuit 11 is used in FIG. 4 and clamping circuit 308 is used in FIG. 3, a single clamping circuit may be used to protect the excessive protection circuit, the short-circuit protection circuit, and the substrate switching circuit.

Figure 6:
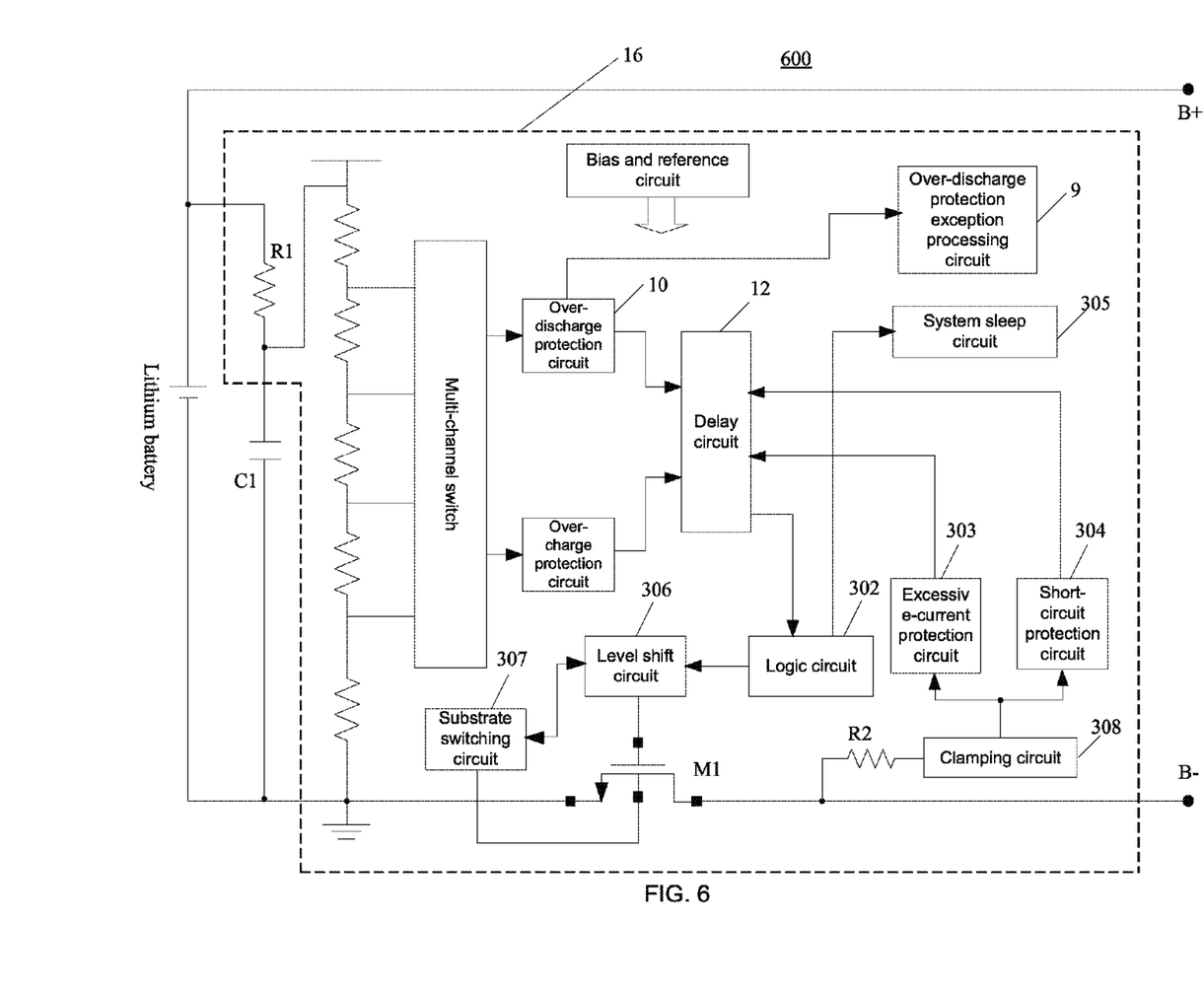
FIG. 6 illustrates another exemplary lithium battery protection circuit consistent with the disclosed embodiments.

FIG. 6 illustrates another exemplary lithium battery protection circuit 600 consistent with the disclosed embodiments. The lithium battery protection circuit 600 is similar to the lithium battery protection circuit 300 in FIG. 3. However, as shown in FIG. 6, lithium battery protection circuit 600 also includes an over-discharge-protection exception-processing circuit 9 that is integrated in the control circuit 16. The over-discharge-protection exception-processing circuit 9 is connected to the over-discharge protection circuit 10.

During the lithium battery discharging process, when the discharging causes the voltage of the lithium battery lower than the over-discharge protection voltage (usually 2V~2.5V), the over-discharge protection circuit 10 starts operating. More particularly, when the over-discharging condition passes through the delay circuit 12, i.e., when the lithium battery voltage has been lower than the over-discharge protection voltage more than a predetermined delay time period, the logic circuit 302 turns off the power transistor M1 through the level shift circuit 306 and the substrate switching circuit 307. The lithium battery is then stopped from further discharging. Further, the logic circuit 302 starts the system sleep circuit 305 to put the entire control circuit 16 into a sleep state to reduce the power consumption of the control circuit 16 itself.

Further, during the lithium battery discharging process, certain exceptions may happen. Such exceptions may cause the lithium battery voltage lower than the over-discharge protection voltage and may further cause the system into the sleep state through the over-discharge protection circuit 10, logic circuit 302, and system sleep circuit 305. However, the lithium battery itself is not over-discharged. The protection circuit 600 should be recovered to its normal operation state after such exceptions. Thus, an external restoring signal or a reset signal may generally need to be given.

In order to prevent such exceptions causing the above problems and avoid external signaling. The over-discharge-protection exception-processing circuit 9 is integrated into the control circuit 16. The over-discharge-protection exception-processing circuit 9 is connected to the over-discharge protection circuit 10. When the lithium battery voltage drops below the over-discharge protection voltage, the over-discharge protection circuit 10 first analyzes the low-voltage situation of the lithium battery. If the over-discharge protection circuit 10 determines that the low voltage is caused by exceptions or abnormal discharging, the over-discharge-protection exception-processing circuit 9 is used to process the exceptions or abnormal discharging and to restore the lithium battery protection circuit 600 to the initial state or normal operational state from the sleep state. Thus, no external reset signal is needed to restore the protection circuit 600 to the initial state. On the other hand, if the over-discharge protection circuit 10 determines that the low voltage is caused by normal discharging, the logic circuit 302 is used to start subsequent processes (e.g., sleep state operations) after the low-voltage level remains for a predetermined time delay.

By using the disclosed methods and systems, the level shift circuit and the substrate switching circuit only need to use PMOS transistors with high source-drain voltages and low-voltage NMOS transistors. Such level shift circuit and substrate switching circuit, integrated with a clamping circuit, can make it unnecessary to use PMOS and NMOS transistors with both high gate-source voltages and high source-drain voltages. The cost of the protection circuitry and/or other devices may be substantially reduced. Further, the control circuit integrates an over-discharge-protection exception-processing circuit to prevent the control circuit from entering into the sleep state due to over-discharge protection caused by abnormal discharging and to avoid using external reset signal to restore the protection circuit to the initial state.

It is understood that the disclosed embodiments may be applied to any semiconductor devices. Various alternations, modifications, or equivalents to the technical solutions of the disclosed embodiments can be obvious to those skilled in the art.

What is claimed is:

1. A lithium battery protection circuit coupled to a lithium battery, comprising:
    an over-charge protection circuit;
    a logic circuit coupled to over-charge protection circuit and having a first logic output and a second logic output;
    a level shift circuit coupled to the logic circuit through the first logic output and the second logic output and configured to convert the first logic output and the second logic output to high voltage levels in an over-charge protection state;
    a substrate switching circuit coupled to the level shift circuit; and
    a power transistor coupled between a negative end of the lithium battery and an external circuit negative electrode,
    wherein the level shift circuit includes:
        a first inverter coupled to the second logic output;
        a plurality of PMOS transistors, at least one of which has high source-drain voltage and low gate-source voltage;
        a plurality of NMOS transistors, at least one of which is a low-voltage NMOS transistor;
        a first NMOS transistor coupled to the first logic output;
        a first transistor group, including a plurality of first group NMOS transistors connected in series, connected in parallel to a source and a drain of the first NMOS transistor;
        a second NMOS transistor coupled to the second logic output; and
        a second transistor group, including a plurality of second group NMOS transistors connected in series, connected in parallel to a source and a drain of the second NMOS transistor.

2. The lithium battery protection circuit according to claim 1, wherein:
    the plurality of PMOS transistors withstand a high negative voltage on the external circuit negative electrode; and
    the plurality of NMOS transistors only need to withstand low voltage levels.

3. The lithium battery protection circuit according to claim 1, wherein:
    the substrate switching circuit is coupled to a substrate of the power transistor, the level shift circuit, and the first logic output, the substrate switching circuit being configured to:
    convert a low voltage level to a high voltage level; and
    provide the high voltage level to the power transistor and the level shift circuit based on the first logic output.

4. The lithium battery protection circuit according to claim 3, wherein the substrate switching circuit further includes:
    a resistor arranged to withstand a high negative voltage from the negative electrode, instead of at least one low-voltage NMOS transistor, in the over-charge protection state.

5. The lithium battery protection circuit according to claim 1, further including:
a clamping circuit coupled between the negative electrode and the substrate switching circuit such that a least one NMOS transistor in the substrate switching circuit only needs to withstand a low voltage level in the over-charge protection state.

6. The lithium battery protection circuit according to claim 1, further including:
an excessive-current protection circuit;
a short-circuit protection circuit; and
a clamping circuit coupled the excessive-current protection circuit and the short-circuit protection circuit to the negative electrode to protect the excessive-current protection circuit and the short-circuit protection circuit from a high negative voltage on the negative electrode in the over-charge protection state.

7. The lithium battery protection circuit according to claim 1, wherein:
the plurality of first group NMOS transistors in the first transistor group are connected in series and in a diode form; and
the plurality of second group NMOS transistors in the second transistor group are connected in series and in the diode form.

8. The lithium battery protection circuit according to claim 1, wherein:
the plurality of PMOS transistors include seven PMOS transistors, from the first to the seventh;
the plurality of NMOS transistors include twelve NMOS transistors, from the first to the twelfth;
the fourth NMOS transistor is coupled to the first logic output through the fourth PMOS transistor;
a first transistor group including the fifth, sixth, and seventh NMOS transistors connected in series is connected to the fourth NMOS transistor in parallel;
the eighth NMOS transistor is coupled to the second logic output through the sixth PMOS transistor;
a second transistor group including the ninth, tenth, and eleventh NMOS transistors connected in series is connected to the eighth NMOS transistor in parallel;
the seventh PMOS transistor is coupled to the second logic output via the first inverter;
a gate and a source of the twelfth NMOS transistor are coupled to a drain and a source of the eighth NMOS transistor, respectively; and
a drain of the twelfth NMOS transistor is coupled to a drain of the seventh PMOS transistor and a gate of the power transistor.

9. The lithium battery protection circuit according to claim 1, wherein substrate switching circuit includes:
a second inverter connected to the first logic output.

10. The lithium battery protection circuit according to claim 1, further including:
an over-discharge protection circuit; and
an over-discharge-protection exception-processing circuit connected to the over-discharge protection circuit and configured to restore the lithium battery protection circuit to an initial state from a sleep state.

11. The lithium battery protection circuit according to claim 1, wherein:
the first NMOS transistor is coupled to the first logic output through a first PMOS transistor; and
the second NMOS transistor is coupled to the second logic output through a second PMOS transistor.

12. A lithium battery protection circuit coupled to a lithium battery, comprising:

a logic circuit having a first logic output and a second logic output;
a level shift circuit coupled to the logic circuit through the first logic output and the second logic output and configured to convert the first logic output and the second logic output to high voltage levels in an over-charge protection state;
a substrate switching circuit coupled to the level shift circuit; and
a power transistor coupled between a negative end of the lithium battery and an external circuit negative electrode,
wherein the level shift circuit includes:
a first transistor coupled to the first logic output through a second transistor;
a first transistor group, including a third transistor connected in series, connected in parallel to a source and a drain of the first transistor;
a fourth transistor coupled to the second logic output through a fifth transistor; and
a second transistor group, including a sixth transistor connected in series, connected in parallel to a source and a drain of the fourth transistor.

13. The lithium battery protection circuit according to claim 12, wherein:
the substrate switching circuit is coupled to the first logic output and the first transistor and the fourth transistor in the level shift circuit, and is configured to provide a voltage to the level shift circuit based on the first logic output.

14. The lithium battery protection circuit according to claim 13, wherein the substrate switching circuit further includes:
an inverter connected to the first logic output; and
a seventh transistor, a gate of the seventh transistor being connected to an output of the inverter.

15. The lithium battery protection circuit according to claim 14, wherein the substrate switching circuit further includes:
a resistor arranged to withstand a high negative voltage from the negative electrode, instead of at least one low-voltage NMOS transistor, in the over-charge protection state.

16. The lithium battery protection circuit according to claim 12, wherein:
the substrate switching circuit is coupled to a substrate of the power transistor, the level shift circuit, and the first logic output, the substrate switching circuit being configured to:
convert a low voltage level to a high voltage level; and
provide the high voltage level to the power transistor and the level shift circuit based on the first logic output.

17. The lithium battery protection circuit according to claim 12, further including:
a clamping circuit coupled between the negative electrode and the substrate switching circuit such that a least one NMOS transistor in the substrate switching circuit only needs to withstand a low voltage level in the over-charge protection state.

18. The lithium battery protection circuit according to claim 12, further including:
an excessive-current protection circuit;
a short-circuit protection circuit; and
a clamping circuit coupled the excessive-current protection circuit and the short-circuit protection circuit to the negative electrode to protect the excessive-current protection circuit and the short-circuit protection circuit from a high negative voltage on the negative electrode in the over-charge protection state.

19. The lithium battery protection circuit according to claim 12, wherein:
the first logic output is coupled to a first transistor group, including a plurality of first group NMOS transistors connected in series and in a diode form, connected to a separate NMOS transistor in parallel; and
the second logic output is coupled to a second transistor group, including a plurality of second group NMOS transistors connected in series and in the diode form, connected to another separate NMOS transistor in parallel.

20. The lithium battery protection circuit according to claim 12, further including:
an over-discharge protection circuit; and
an over-discharge-protection exception-processing circuit connected to the over-discharge protection circuit and configured to restore the lithium battery protection circuit to an initial state from a sleep state.

* * * * *